(12) United States Patent
Devismes

(10) Patent No.: US 8,413,428 B2
(45) Date of Patent: Apr. 9, 2013

(54) EXHAUST COMPONENT OF GAS EXHAUST LINE

(75) Inventor: Stéphane Devismes, Mathay (FR)

(73) Assignee: Faurecia Systemes d'Echappement, Société Par Actions Simplifiée, Nanterre (FR)

( * ) Notice: Subject to any disclaimer, the term of this patent is extended or adjusted under 35 U.S.C. 154(b) by 0 days.

(21) Appl. No.: 12/293,084

(22) PCT Filed: Jan. 31, 2007

(86) PCT No.: PCT/FR2007/050716
§ 371 (c)(1),
(2), (4) Date: Nov. 6, 2008

(87) PCT Pub. No.: WO2007/090972
PCT Pub. Date: Aug. 16, 2007

(65) Prior Publication Data
US 2009/0145118 A1    Jun. 11, 2009

(30) Foreign Application Priority Data
Feb. 8, 2006  (FR) ...................................... 06 50439

(51) Int. Cl.
*F01N 3/00* (2006.01)

(52) U.S. Cl. ................ 60/288; 60/287; 60/292; 60/297; 60/324

(58) Field of Classification Search .................... 60/287, 60/288, 297, 299, 302, 324; 181/212, 220, 181/258, 268, 276
See application file for complete search history.

(56) References Cited

U.S. PATENT DOCUMENTS

| | | | | |
|---|---|---|---|---|
| 3,892,071 A | * | 7/1975 | Garcea | 60/288 |
| 3,908,366 A | * | 9/1975 | Masaki | 60/277 |
| 3,957,444 A | * | 5/1976 | Goto et al. | 422/111 |
| 4,916,897 A | * | 4/1990 | Hayashi et al. | 60/286 |
| 5,052,178 A | * | 10/1991 | Clerc et al. | 60/274 |
| 5,063,736 A | * | 11/1991 | Hough et al. | 60/286 |
| 6,378,298 B2 | * | 4/2002 | Harima et al. | 60/288 |
| 6,422,007 B1 | * | 7/2002 | Hartick | 60/298 |
| 6,588,203 B2 | * | 7/2003 | Hirota et al. | 60/297 |
| 6,662,554 B2 | * | 12/2003 | Sheidler et al. | 60/290 |
| 7,150,147 B2 | * | 12/2006 | Murata | 60/287 |
| 7,249,455 B2 | * | 7/2007 | Tumati et al. | 60/287 |

* cited by examiner

*Primary Examiner* — Thomas Denion
*Assistant Examiner* — Diem Tran
(74) *Attorney, Agent, or Firm* — Egbert Law Offices, PLLC

(57) ABSTRACT

The invention relates to an exhaust component in a gas exhaust line for gases produced by the combustion of a fuel in a heat engine. In the gas flow direction, there is a first connection to an upstream pipe carrying gases from the engine. There is also a first exhaust tube and a second exhaust tube, these two tubes being parallel and being connected to the first connection. There is a second connection to a downstream gas discharge pipe, connected to the parallel exhaust tubes. The component is characterized in that, firstly the first tube has a depolluting component, and the second tube has a silencer. The second connection is a three-way valve.

5 Claims, 1 Drawing Sheet

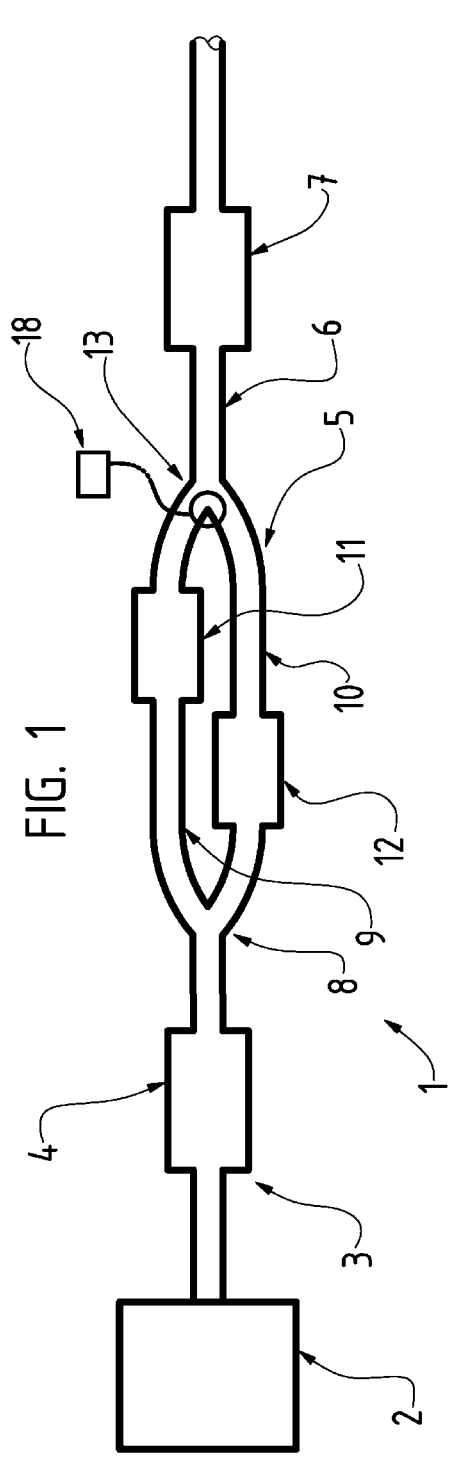
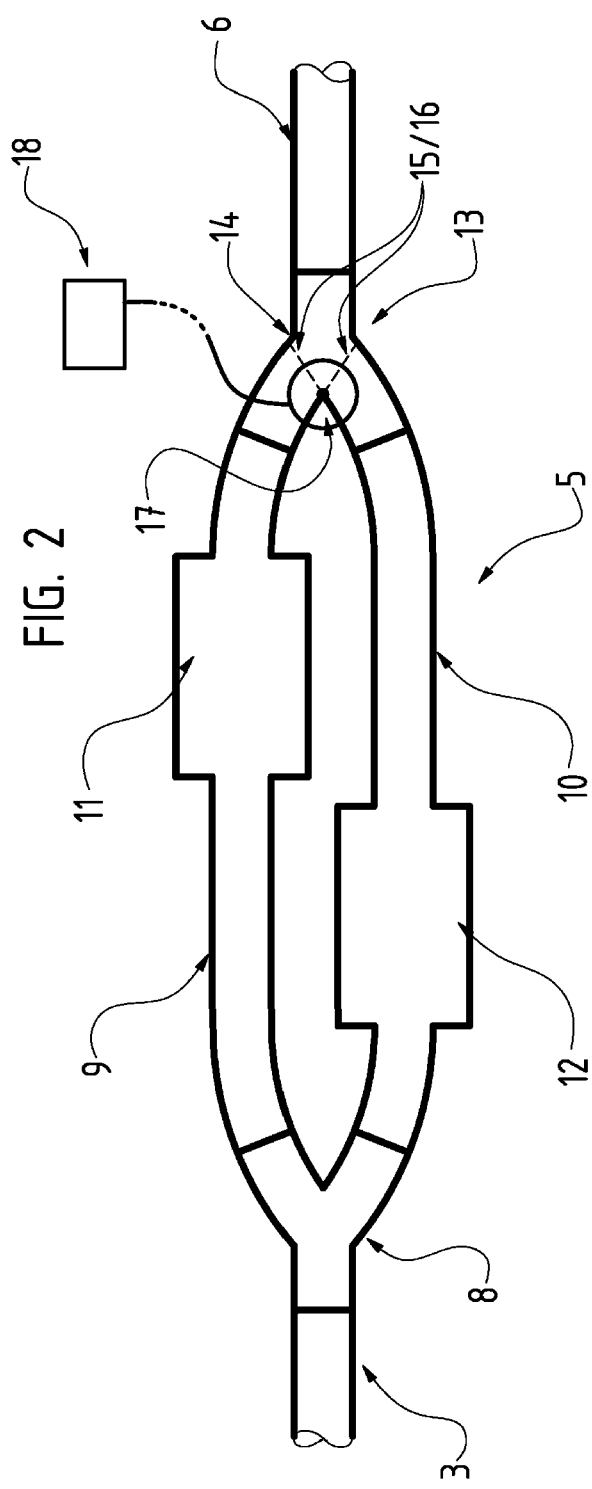

EXHAUST COMPONENT OF GAS EXHAUST LINE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to an exhaust component, which is included in a gas-exhaust line for gases resulting from the combustion of a fuel within a heat engine. This invention also relates to an exhaust line including such an exhaust component as well as to an installation for the exhaust of gases including such an exhaust component.

This invention relates to the field of the car industry and, in particular, to that of the manufacture of equipment to ensure the exhaust of gases resulting from the combustion of a fuel within a thermal combustion engine, which a motor vehicle includes.

2. Description of Related Art Including Information Disclosed Under 37 CFR 1.97 and 37 CFR 1.98.

The equipment of the prior art adopts the shape of an exhaust line connected to said engine, at the level of the outlet of the latter, and includes, in the direction of the gas flow, first of all, an upstream pipe for conveying the gases coming from the engine and connected to the latter. Then, there is a first means for connecting to the upstream pipe for conveying the gases, then, a first tube and a second exhaust tube. These two tubes are parallel and connected to said first connection means. This exhaust line then includes a second connection means connected to said parallel exhaust tubes and, finally, a downstream gas-discharge pipe connected to this second connection means.

In this respect, it should be noted that the first connection means is, usually, formed of a three-way valve installed directly at the outlet of the upstream gas-conveying tube and including, internally, movable means designed to direct the gas flow, as the case may be, towards the first or the second of the parallel exhaust tubes. Because of the installation of the three-way valve near the engine, the exhaust gases, coming from this engine and having a particularly high temperature, subject this three-way valve to such temperature stresses that they cause degradations to the movable means, which results into a dysfunction of the exhaust line.

It should also be noted that the first exhaust tube includes, usually, a decontamination element as well as a silencer installed in series with the decontamination element. A second exhaust tube is formed by a bypass tube. The presence of a decontamination element and a silencer in series at the level of the first tube generates, in this first tube and in the three-way valve, an important counter-pressure which, on the one hand, is prejudicial to the proper operation of this valve and, on the other hand, requires the use of powerful and large-size and highly energy-consuming means for activating this valve, so as to be able to withstand this important counter-pressure and to counteract the latter.

BRIEF SUMMARY OF THE INVENTION

The present invention copes with the disadvantages of the state-of-the-art devices.

To this end, the invention relates to an exhaust component, which is included in an exhaust line for the gases resulting from the combustion of a fuel within a heat engine. The exhaust component includes, in the direction of the gas flow, on the one hand, first means for connecting to an upstream pipe for conveying the gases coming from the engine, on the other hand, a first tube and a second exhaust tube. These two tubes are parallel and connected to said first connection means. Still on the other hand, a second means for connecting to a downstream gas-discharge pipe is connected to said parallel exhaust tubes. This exhaust-line element is characterized in that, on the one hand, the first tube includes a decontamination element. The second tube includes a silencer. A second connection means is formed by a three-way valve.

Another feature consists in that the three-way valve includes, internally, means for closing either the first tube or the second tube, such closing means being formed by a valve mounted tilting between a first closing position of the first tube and a second closing position of the second tube.

An additional feature consists in that this exhaust component includes means for moving the closing means of the three-way valve between a first closing position of the first tube and a second closing position of the second tube, and vice-versa.

The invention also relates to an exhaust line for the gases resulting from the combustion of a fuel within a heat engine and including, on the one hand, an exhaust component of the above-mentioned type and, on the other hand, an upstream pipe connected to the engine and including a light-off catalyst.

This invention also relates to an exhaust line including, on the one hand, an exhaust component of the above-mentioned type and, on the other hand, a downstream pipe including a main-type silencer, whereas the silencer that said second tube of the exhaust component includes is of an intermediate type.

Finally, the invention relates to an installation for the exhaust of gases resulting from the combustion of a fuel within a heat engine and including, on the one hand, an exhaust component of the above-mentioned type and, on the other hand, means for driving the three-way valve forming the second connection means.

The advantages of the present invention consist in that the exhaust-line element includes a three-way valve installed downstream with respect to the parallel exhaust tubes, thus after a silencer or a decontamination element. Such an installation advantageously allows lowering the temperature of the exhaust gases penetrating into this three-way valve.

Another advantage consists in that the first exhaust tube includes an exhaust component, whereas the second exhaust tube includes a silencer, which advantageously allows reducing the counter-pressure in the first exhaust tube and thus to use means for activating the valve that consume less energy and, especially, having a reduced size compared to the state-of-the-art valves.

Still another advantage resides in that the first exhaust tube includes a decontamination element, whereas the second exhaust tube includes a silencer. Therefore, when the three-way valve ensures the closing of the first exhaust tube, the exhaust gases pass through the silencer and the acoustic behavior of the exhaust line is at its maximum efficiency. When this three-way valve ensures the closing of the second exhaust tube, the exhaust gases pass through said decontamination element, which also has a sound-attenuation effect that can be very slightly lower than that produced by the silencer of the second exhaust tube. Thus, irrespective the tube through which exhaust gases pass, a clear reduction of the sound emission at the level of the exhaust line undoubtedly occurs, in contrast to the state-of-the-art devices.

Other aims and advantages of the present invention will become clear during the following description, with reference to the embodiments, which are given only by way of an indication and non-restrictive examples.

BRIEF DESCRIPTION OF THE SEVERAL VIEWS OF THE DRAWINGS

This description will be better understood when referring to the attached drawings.

FIG. 1 is a schematic view of an exhaust line connected to the engine and including an exhaust component according to the present invention.

FIG. 2 is a detailed schematic view of an exhaust component according to the present invention.

DETAILED DESCRIPTION OF THE INVENTION

The invention relates to the field of the car industry and, in particular, to that of the manufacture of equipment to ensure the exhaust of gases resulting from the combustion of a fuel within a thermal combustion engine a motor vehicle includes.

As can be seen in FIG. 1, such equipment of the present invention is in the form of an exhaust line 1 for these gases connected to the engine 2 of such a motor vehicle.

This exhaust line 1 includes, in the direction of the flow of the gases resulting from the combustion of the fuel within this engine 2:
- an upstream pipe 3 being connected to that engine 2 and including a light-off catalyst 4 or the like;
- an exhaust component 5 connected to said upstream pipe 3; and
- a downstream pipe 6 being connected to said exhaust component 5 and including a main-type silencer 7.

As regards said exhaust component 5 shown in more detail in FIG. 2, the component 5 includes, here too in the direction of the gas flow:
- a first means 8 for connecting this exhaust component 5 to said upstream pipe 3 for conveying the gases coming from the engine 2, this first connection means 8 being, in particular, formed by a collector;
- two parallel exhaust tubes 9, 10 connected to this first connection means 8 and formed, on the one hand, by a first exhaust tube 9 including a decontamination element 11, in particular formed by a nitrogen-oxide trap, namely a "NOX TRAP" or the like, and, on the other hand, by a second exhaust tube 10 including a silencer 12, in particular of the intermediate type; and
- a second means 13 for connecting this exhaust component 5 to said downstream pipe 6 for discharging the gases, this second connection means 13 being connected to said first 9 and second 10 parallel exhaust tubes.

As can be seen in the attached figures, the decontamination element 11 and the silencer 12 are shifted along the exhaust line 1 so as to allow nearing the exhaust tubes 9, 10 and, thus, a reduction of the space occupied by such an exhaust line 1.

As regards said second connection means 13, it is formed by a three-way valve 14 including, internally, means 15 for closing either the first exhaust tube 9 or the second exhaust tube 10.

Obviously, these closing means 15 can also adopt an intermediate position between these two closing positions. The three-way valve 14 permits the passing through of the gases coming from the first 9 as well as from the second 10 exhaust tube, this towards the downstream pipe 6.

In fact and according to an additional feature of the invention, these closing means 15 are formed of a valve 16 or the like mounted pivotally about an axis, this between a first closing position of the first exhaust tube 9 and a second closing position of the second exhaust tube 10.

A particular embodiment of the invention consists in that such a valve 16 includes, on the one hand, a first part designed so as to ensure the closing of this first exhaust tube 9 and, on the other hand, a second part designed so as to ensure the closing of this second exhaust tube 10.

In fact and according to a first embodiment, such a valve 16 can adopt the shape of a flap mounted pivotally at the level of one of its ends and having two sides, one of which forms said first part, whereas the other forms said second part of this valve 16.

However and according to another embodiment, such a valve 16 can adopt a "V"-shape and then include two wings located in the extension of each other and one of which forms said first part, whereas the other forms said second part of this valve 16.

According to another feature of the present invention, the exhaust component 5 also includes means 17 for moving the closing means 15 of the three-way valve 14 between a first closing position of the first exhaust tube 9 and a second closing position of the second exhaust tube 10, and vice-versa.

In the particular case of the closing means 15 formed of a valve 16, said means 17 for moving these closing means 15 are formed of means for pivotally driving this valve 16 about its axis, this between the first closing position of the first tube 9 and the second closing position of the second tube 10.

In this respect, it should be noted that the means 17 for moving the closing means 15 (namely defined by means for pivotally driving the valve 16) are formed by an engine, associated with the three-way valve 14, installed outside the latter 14, in engagement with the closing means 15 and connected to means for driving 18 these closing means 15.

Such driving means 18 are designed so as to drive these closing means 15 depending on the various parameters of the engine and/or on various decontamination parameters. Such driving means 18 are preferably formed by a control engine a motor vehicle includes.

The invention also relates to an exhaust line 1 for the gases resulting from the combustion of a fuel within a heat engine 2, such an exhaust line 1 including, on the one hand, an exhaust component 5 having the above-mentioned features and, on the other hand, an upstream pipe 3 connected to the engine 2 and including a light-off catalyst 4 or the like.

This invention also relates to an exhaust line 1 including, on the one hand, an exhaust component 5 having the above-mentioned features and, on the other hand, a downstream pipe 6 including a main-type silencer 7. The silencer 12, said second exhaust tube 10 of the exhaust component 5 includes, is of an intermediate type.

Finally, the invention relates to an installation for the exhaust of the gases resulting from the combustion of a fuel within a heat engine 2 and including at least, on the one hand, an exhaust line 2 element 5 and, on the other hand, means for driving 18 the three-way valve 14 forming the above-mentioned second connection means 13.

I claim:

1. An exhaust system for gases resulting from a combustion of fuel within a heat engine, the exhaust system comprising:
    an upstream pipe suitable for conveying the gases;
    a first connector affixed to said upstream pipe, said first connector having a first branch and a second branch at an end opposite said upstream pipe;
    a first exhaust tube affixed at one end to said first branch of said first connector, said first exhaust tube having a decontamination element therealong;
    a second exhaust tube affixed at one end to said second branch of said first connector, said second exhaust tube having a silencer therealong, said first exhaust tube being parallel to said second exhaust tube;
    a second connector having a first branch connected to said first exhaust tube and a second branch connected to said second exhaust tube, said second connector being downstream of both of said first exhaust tube and said second exhaust tube;
    a single downstream pipe connected to said second connector at an end opposite said first branch and said second branch thereof;
    a three-way valve cooperative with said second connector, said three-way valve movable between a first position and a second position and a third position, said first position closing said first exhaust tube and opening said second exhaust tube so as to allow gases from said second exhaust tube to pass to said downstream pipe, said second position opening said first exhaust tube and said second exhaust tube so as to allow gases from both said first exhaust tube and said second exhaust tube to pass to said downstream pipe, said third position opening said first exhaust tube and closing said second exhaust tube so as to allow gases from said first exhaust tube to pass to said downstream pipe; and
    a drive mechanism connected to said three-way valve outside of said three-way valve so as to drive said three-way valve between said first position and said second position and said third position.

2. The exhaust system of claim 1, said first connector being a collector.

3. The exhaust system of claim 1, said decontamination element being a nitrogen-oxide trap.

4. The exhaust system of claim 1, said upstream pipe suitable for connection to the heat engine, said upstream pipe having a light-off catalyst.

5. The exhaust system of claim 1, said silencer of said second exhaust tube being an intermediate silencer, said downstream pipe having a main silencer thereon.

* * * * *